United States Patent
Shimauchi et al.

(10) Patent No.: US 12,497,027 B2
(45) Date of Patent: Dec. 16, 2025

(54) VEHICLE CONTROL DEVICE

(71) Applicant: TOYOTA JIDOSHA KABUSHIKI KAISHA, Toyota (JP)

(72) Inventors: Takayuki Shimauchi, Toyota (JP); Hidekazu Hirabayashi, Chiryu (JP); Atsushi Ono, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 18/365,764

(22) Filed: Aug. 4, 2023

(65) Prior Publication Data

US 2024/0116496 A1   Apr. 11, 2024

(30) Foreign Application Priority Data

Oct. 5, 2022   (JP) ................. 2022-160778

(51) Int. Cl.
*B60W 30/08*   (2012.01)
(52) U.S. Cl.
CPC ....... *B60W 30/08* (2013.01); *B60W 2030/082* (2013.01)

(58) Field of Classification Search
CPC .............. B60W 30/08; B60W 2030/082
See application file for complete search history.

(56) References Cited

U.S. PATENT DOCUMENTS

| 2013/0079963 A1* | 3/2013 | Shono ............... H02K 9/19 165/200 |
| 2014/0174708 A1 | 6/2014 | Akiyama et al. |
| 2016/0101666 A1* | 4/2016 | Sugimura .......... B60H 1/00785 236/5 |

FOREIGN PATENT DOCUMENTS

| JP | 2004-036867 A | 2/2004 |
| WO | 2013/024535 A1 | 2/2013 |

* cited by examiner

*Primary Examiner* — Todd Melton
*Assistant Examiner* — Oliver Tan
(74) *Attorney, Agent, or Firm* — SoraIP, Inc.

(57) ABSTRACT

A cooling ECU for a vehicle including a high-temperature-side coolant circuit that circulates high-temperature-side coolant by a high-temperature-side water pump, and an airbag ECU that detects collision stops the high-temperature-side water pump when the collision is detected by the airbag ECU and the high-temperature-side coolant is equal to or higher than a first predetermined temperature determined based on the boiling point of the water.

7 Claims, 3 Drawing Sheets

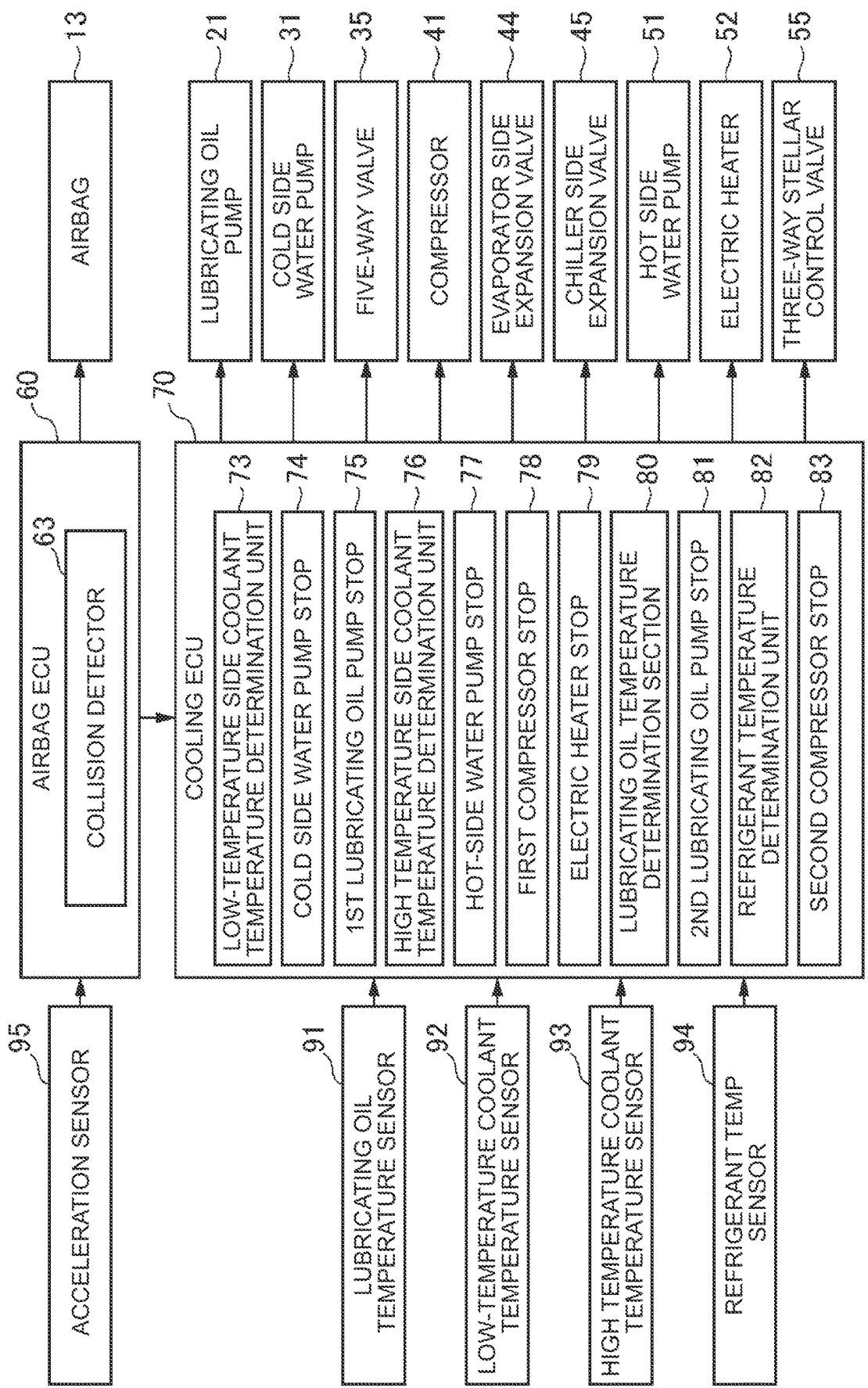

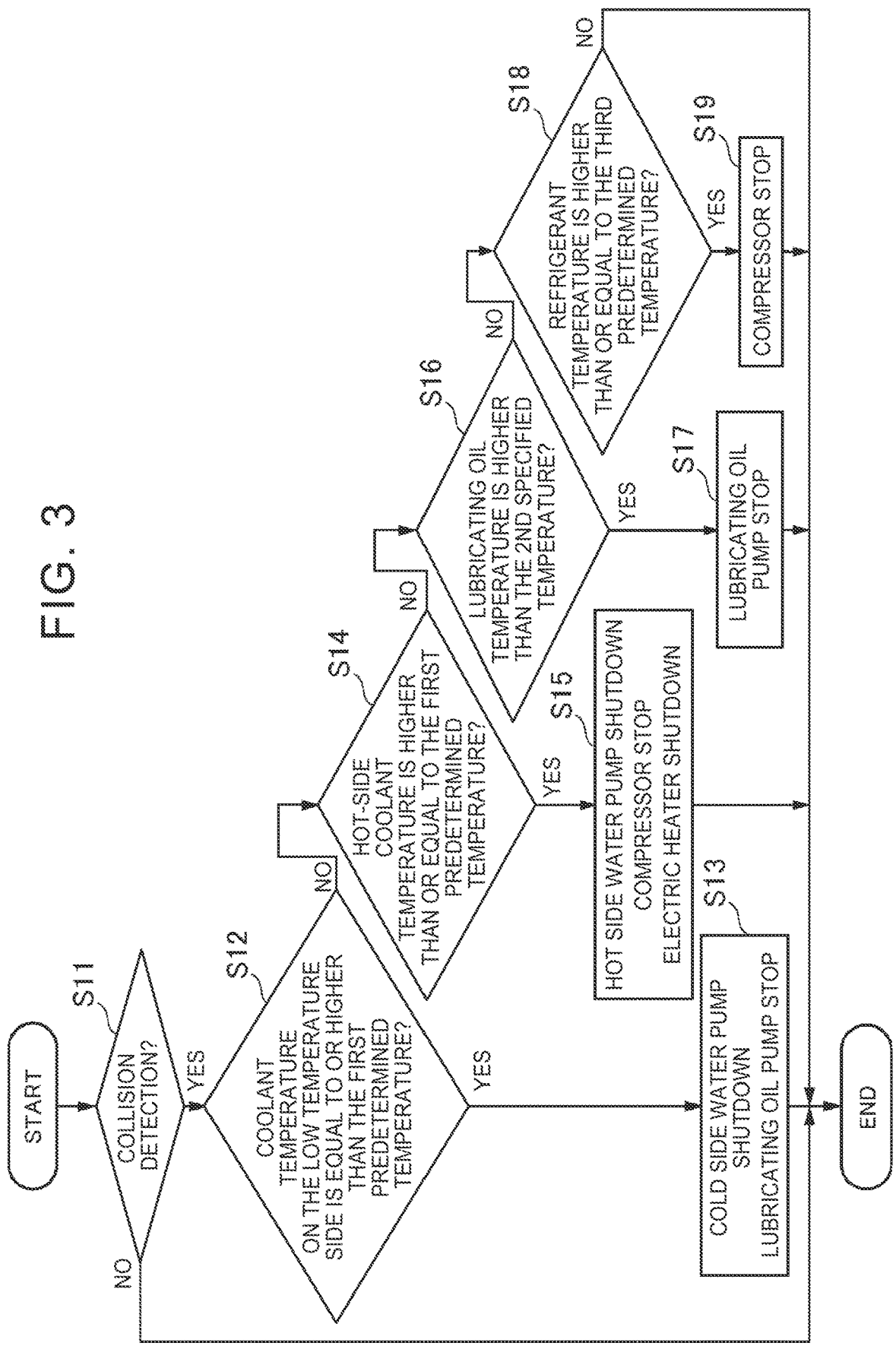

VEHICLE CONTROL DEVICE

CROSS-REFERENCE TO RELATED APPLICATION

This application claims priority to Japanese Patent Application No. 2022-160778 filed on Oct. 5, 2022, incorporated herein by reference in its entirety.

BACKGROUND

1. Technical Field

The present disclosure relates to a control device for a vehicle including a circuit for circulating a heat medium by a drive device and a collision detection device for detecting a collision.

2. Description of Related Art

The vehicle includes a collision detection device that detects a collision of the vehicle. When a collision is detected by the collision detection device, the vehicle executes control such as stopping a circuit that circulates a heat medium, from the viewpoint of safety. For example, Japanese Unexamined Patent Application Publication No. 2004-036867 (JP 2004-036867 A) discloses a technique of shutting off a path of a coolant of a fuel cell at the time of collision detection.

SUMMARY

However, there may be cases where it is not necessary to stop the circuit that circulates the heat medium at the time of collision detection. For example, in the case where a small amount of leakage occurs in the heat exchanger, when the heat medium is not at a high temperature, it is unlikely that the heat medium has an adverse effect on the surroundings, so that it is not necessary to stop the circuit.

An object of the present disclosure is to provide a vehicle control device capable of executing a process in accordance with a temperature of a heat medium at the time of collision detection.

A vehicle control device according to the present disclosure is a vehicle control device for a vehicle including a first heat medium circuit for circulating a first heat medium by a first drive device and a collision detection device for detecting a collision. In a case where a collision is detected by the collision detection device, when the first heat medium is equal to or higher than a predetermined temperature determined based on a boiling point of the first heat medium, the vehicle control device stops the first drive device.

Accordingly, it is possible to suppress the high-temperature first heat medium from leaking and adversely affecting the surroundings.

The vehicle control device according to the present disclosure further includes a second heat medium circuit for circulating a second heat medium having a boiling point higher than the boiling point of the first heat medium by a second drive device and for exchanging heat with the first heat medium circuit. In the case where a collision is detected by the collision detection device, when the first heat medium is equal to or higher than a predetermined temperature determined based on the boiling point of the first heat medium, the vehicle control device preferably stops the second drive device.

Accordingly, it is possible to suppress the temperature of the first heat medium of the first heat medium circuit in which the circulation is stopped from becoming higher.

In the vehicle control device according to the present disclosure, the first heat medium circuit includes a heating device for heating the first heat medium, and in the case where a collision is detected by the collision detection device, when the first heat medium is equal to or higher than a predetermined temperature determined based on the boiling point of the first heat medium, the vehicle control device preferably stops the heating device.

Accordingly, it is possible to suppress the temperature of the first heat medium of the first heat medium circuit in which the circulation is stopped from becoming higher.

According to the vehicle control device of the present disclosure, it is possible to execute a process in accordance with the temperature of the heat medium at the time of collision detection.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block-diagram illustrating a configuration of a vehicle control device according to an exemplary embodiment; and FIG. 3 is a flowchart illustrating a flow of circuit stop control.

DETAILED DESCRIPTION OF EMBODIMENTS

Figure 1:
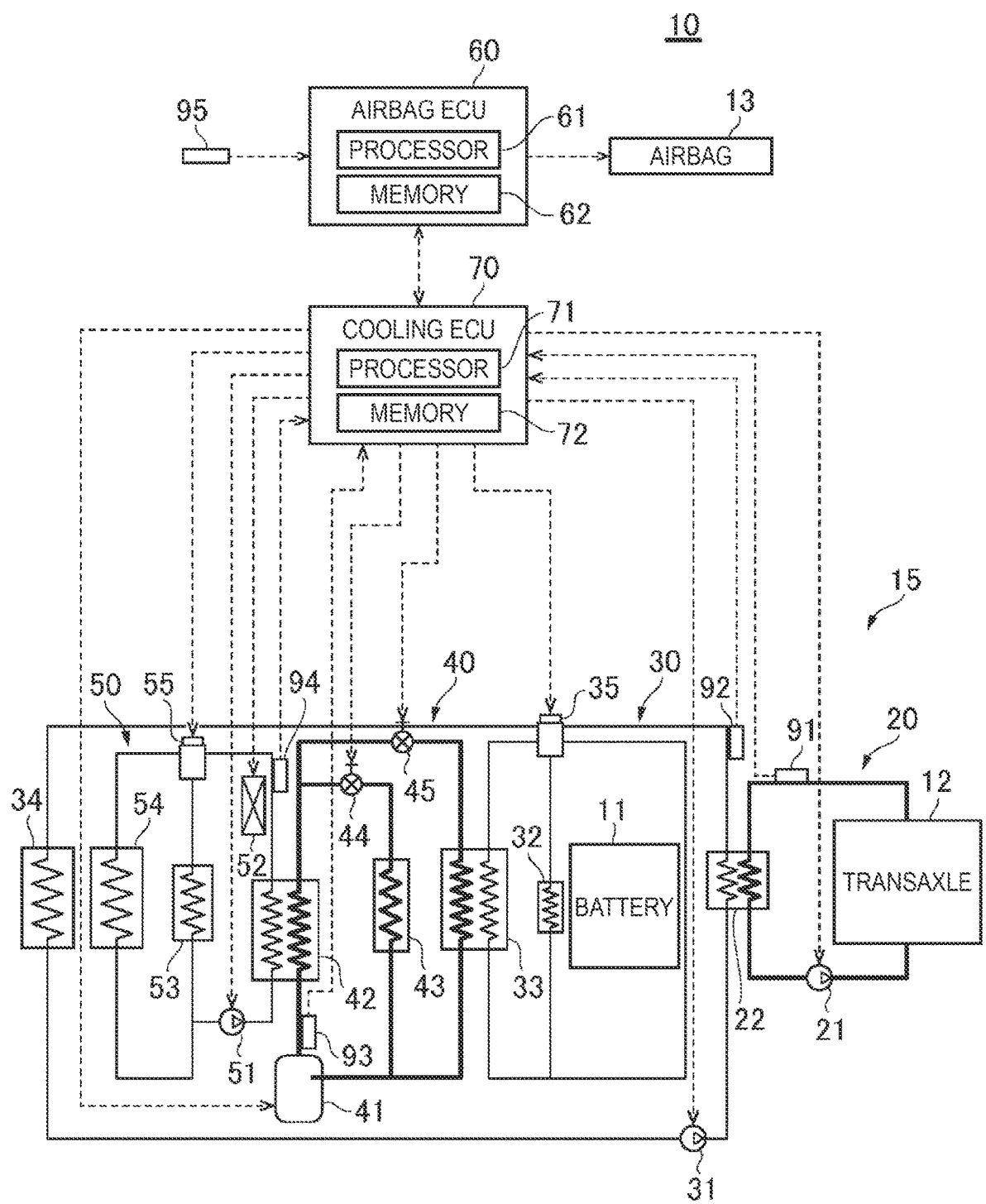
FIG. 1 is a schematic diagram illustrating a configuration of a cooling system according to an embodiment.

Hereinafter, an example of an embodiment of the present disclosure will be described in detail. In the following description, specific shapes, materials, directions, numerical values, and the like are examples for facilitating the understanding of the present disclosure, and can be appropriately changed according to applications, purposes, specifications, and the like.

The cooling Electronic Control Unit (ECU) 70 as the vehicle control device stops the circulation of the high-temperature-side coolant circuit 50 when the high-temperature-side coolant of the high-temperature-side coolant circuit 50 is equal to or higher than the first predetermined temperature determined based on the boiling point of the water at the time of the collision of the vehicle 10. As will be described later, according to the cooling ECU 70, it is possible to execute a process corresponding to the temperature of the high-temperature-side coolant at the time of collision detection.

Vehicle

The vehicle 10 according to the embodiment will be described with reference to FIG. 1.

Vehicle 10 is a battery electric vehicle (BEV that drives a motor (not shown) only by electric power of battery 11 and travels. However, the vehicles 10 may be hybrid electric vehicle (HEV) running by driving a gasoline engine and a motor. In addition, it may be a plug-in hybrid electric vehicle (PHEV) that can charge HEV battery 11 from the power supply facility.

As illustrated in FIG. 1, a vehicle 10 includes a traveling battery 11, a transaxle 12 that is a device in which a transmission and a differential gear are integrated, a cooling system 15 that circulates coolant, a refrigerant, and a lubricating oil to cool each device, an airbag ECU 60 as a collision detection device that operates the airbag 13 when the vehicle 10 collides, and a cooling ECU 70 as a vehicle control device that controls each device of the cooling system 15. The transaxle 12 may be provided on the front side and the rear side, respectively.

Cooling System

With reference to FIG. 1, a cooling system 15 according to an embodiment will be described.

The cooling system 15 includes a lubricating oil circuit 20 that circulates the lubricating oil of the transaxle 12, a low-temperature-side coolant circuit 30 that circulates the low-temperature-side coolant and cools the lubricating oil circuit 20 and the battery 11, a refrigeration cycle circuit 40 that circulates the refrigerant and absorbs heat from the low-temperature-side coolant circuit 30, and a high-temperature-side coolant circuit 50 that circulates the high-temperature-side coolant and absorbs heat from the refrigeration cycle circuit 40.

Here, the lubricating oil, the low-temperature-side coolant, the refrigerant, and the high-temperature-side coolant may each correspond to the first heat medium. When the low-temperature-side coolant corresponds to the first heat medium, the low-temperature-side coolant is heat-exchanged with the low-temperature-side coolant, and the lubricating oil having a boiling point higher than that of the water corresponds to the second heat medium. Further, when the high-temperature-side coolant corresponds to the first heat medium, the high-temperature-side coolant is heat-exchanged with the high-temperature-side coolant, and the refrigerant having a boiling point higher than that of the water corresponds to the second heat medium.

Similarly, the lubricating oil circuit 20, the low-temperature-side coolant circuit 30, the refrigeration cycle circuit 40, and the high-temperature-side coolant circuit 50 may each correspond to the first heat medium circuit. When the low-temperature-side coolant circuit 30 corresponds to the first heat medium circuit, the lubricating oil circuit 20 corresponds to the second heat medium circuit. Further, when the high-temperature-side coolant circuit 50 corresponds to the first heat medium circuit, the refrigeration cycle circuit 40 corresponds to the second heat medium circuit.

Similarly, the lubricating oil pump 21, the low-temperature-side water pump 31, the compressor 41, and the high-temperature-side water pump 51 may each correspond to the first driving device. When the low-temperature-side water pump 31 corresponds to the first driving device, the lubricating oil pump 21 corresponds to the second driving device. Further, when the hot-side water pump 51 corresponds to the first drive device, the compressor 41 corresponds to the second drive device.

In the lubricating oil circuit 20, the lubricating oil of the transaxle 12 is circulated by driving the lubricating oil pump 21 as a driving device, and the gear or the like of the transaxle 12 is cooled and absorbed by the oil cooler 22. In the lubricating oil circuit 20, a lubricating oil temperature sensor 91 is provided on the downstream side of the transaxle 12.

The low-temperature-side coolant circuit 30 cools the battery 11 by the battery cooler 32 by circulating the low-temperature coolant by the low-temperature-side water pump 31 as a driving device, cools the lubricating oil circuit 20 by the oil cooler 22, is absorbed by the chiller 33 in the refrigeration cycle circuit 40, and is cooled by being radiated into the air by the low-temperature-side radiator 34.

In the low-temperature-side coolant circuit 30, a battery cooler 32, an oil cooler 22, a chiller 33, and a low-temperature-side radiator 34 are provided in parallel. A path toward the battery cooler 32, a path toward the oil cooler 22, a path toward the chiller 33, a path toward the low-temperature-side radiator 34, and a short-circuit path (a path in which nothing is provided) are connected by a five-way valve 35. In the low-temperature-side coolant circuit 30, a low-temperature-side coolant temperature sensor 92 is provided downstream of the oil cooler 22.

In the low-temperature-side coolant circuit 30, the step-up/step-down converter may be cooled by a path toward the oil cooler 22. Power Control Unit (PCU) may also be cooled by a path towards the oil cooler 22.

Refrigeration cycle circuit 40 includes a compressor 41 as a driving device for compressing a refrigerant, a water-cooled condenser 42 for heating (waste heat) the coolant circulating in the high-temperature-side coolant circuit 50, an evaporator 43 for cooling the air blown into the vehicle cabin, an evaporator-side expansion valve 44 for adjusting the refrigerant circulation amount to the evaporator 43, a chiller 33 for absorbing heat from the coolant circulating in the low-temperature-side coolant circuit 30, and a chiller-side expansion valve 45 for adjusting the refrigerant circulation amount to the chiller 33.

In the refrigeration cycle circuit 40, the evaporator 43 and the chiller 33 are connected in parallel. Further, in the refrigeration cycle circuit 40, a refrigerant temperature sensor 93 is provided upstream of the water-cooled condenser 42.

The high-temperature-side coolant circuit 50 absorbs heat from the water-cooling condenser 42 by circulating the high-temperature-side coolant by the high-temperature-side water pump 51 serving as a driving device, and is heated by an electric heater 52 serving as a heating device, heats a heater core 53 that heats air to be blown into the vehicle cabin, and is cooled by being radiated into the air by the high-temperature-side radiator 54.

In the high-temperature-side coolant circuit 50, a water-cooled condenser 42, an electric heater 52, a heater core 53, and a high-temperature-side radiator 54 are provided in parallel. A path toward the water-cooled condenser 42 and the electric heater 52, a path toward the heater core 53, and a path toward the high-temperature-side radiator 54 are connected by a three-way flow rate regulating valve 55. In the high-temperature-side coolant circuit 50, a high-temperature-side coolant temperature sensor 94 is provided downstream of the electric heater 52.

The airbag ECU 60 detects a collision of the vehicles 10 by an impact detected by the acceleration sensor 95, and activates the airbag 13. The airbag 13 may be provided at a plurality of locations such as a driver's seat, a passenger seat, and a rear seat. The airbag ECU 60 is a computer including a processor 61 having a CPU for performing information processing therein, and a memory 62 for storing software, programs, or data executed by the processor 61.

The airbag ECU 60 is connected to the acceleration sensor 95 and the airbag 13. The airbag ECU 60 is connected to a refrigeration ECU 70. The functions of the airbag ECU 60 will be described later.

The cooling ECU 70 controls the components of the cooling system 15 and performs circuit-stop control, which will be described later. The cooling-use ECU 70 is a computer including a processor 71 having a CPU for performing information processing therein, and a memory 72 for storing software, programs, or data executed by the processor 71.

The cooling ECU 70 is connected to the lubricating oil pump 21 of the lubricating oil circuit 20, the low-temperature-side water pump 31 and the five-way valve 35 of the low-temperature-side coolant circuit 30, the compressor 41 of the refrigeration cycle circuit 40, the evaporator-side expansion valve 44 and the chiller-side expansion valve 45, the high-temperature-side water pump 51 of the high-temperature-side coolant circuit 50, the electric heater 52 and the three-way flow rate regulating valve 55.

The cooling ECU 70 is connected to the lubricating oil temperature sensor 91, the low-temperature-side coolant temperature sensor 92, the refrigerant temperature sensor 93, and the high-temperature-side coolant temperature sensor 94. Further, the refrigeration ECU 70 is connected to the airbag ECU 60. The function of the cooling-use ECU 70 will be described later.

Vehicle Control Device

With reference to FIG. 2, the functions of a refrigeration ECU 70 as a vehicle control device according to an exemplary embodiment and the functions of an airbag ECU 60 will be described.

The airbag ECU 60 includes a collision detection unit 63. The collision detection unit 63 is realized by the processor 61 executing a program stored in the memory 62. The collision detection unit 63 detects a collision of the vehicle 10 by an impact detected by the acceleration sensor 95 and activates the airbag 13.

The cooling ECU 70 includes a low-temperature-side coolant temperature determination unit 73, a low-temperature-side water pump stopping unit 74, a first lubricating oil pump stopping unit 75, a high-temperature-side coolant temperature determination unit 76, a high-temperature-side water pump stopping unit 77, a first compressor stopping unit 78, an electric heater stopping unit 79, a lubricating oil temperature determination unit 80, a second lubricating oil pump stopping unit 81, a refrigerant temperature determination unit 82, and a second compressor stopping unit 83.

The low-temperature-side coolant temperature determination unit 73, the low-temperature-side water pump stopping unit 74, the first lubricating oil pump stopping unit 75, the high-temperature-side coolant temperature determination unit 76, the high-temperature-side water pump stopping unit 77, the first compressor stopping unit 78, the electric heater stopping unit 79, the lubricating oil temperature determination unit 80, the second lubricating oil pump stopping unit 81, the refrigerant temperature determination unit 82, and the second compressor stopping unit 83 are realized by the processor 71 executing a program stored in the memory 72.

The low-temperature-side coolant temperature determination unit 73 determines whether the low-temperature-side coolant temperature detected by the low-temperature-side coolant temperature sensor 92 is equal to or higher than the first predetermined temperature. The first predetermined temperature is determined based on the boiling point of the low-temperature-side coolant, and is stored in the memory 72. The first predetermined temperature is, for example, 85° C. which is slightly lower than the boiling point (100° C.) of water.

When the collision detection unit 63 of the airbag ECU 60 detects the collision of the vehicle 10 and the low-temperature-side coolant temperature determination unit 73 determines that the low-temperature-side coolant temperature is equal to or higher than the first predetermined temperature, the low-temperature-side water pump stopping unit 74 stops the low-temperature-side water pump 31 and stops the circulation of the low-temperature-side coolant in the low-temperature-side coolant circuit 30. According to the low-temperature-side water pump stopping unit 74, it is possible to suppress the high-temperature low-temperature-side coolant from leaking and adversely affecting the surroundings.

Normally, in the low-temperature-side coolant circuit 30, since the low-temperature-side coolant temperature is circulated so as to be 65° C. or less, the low-temperature-side coolant temperature does not become a predetermined temperature (85° C.) or more except in the abnormal case.

When the low-temperature-side water pump 31 is stopped by the low-temperature-side water pump stopping unit 74, the first lubricating oil pump stopping unit 75 stops the lubricating oil pump 21 and stops the circulation of the lubricating oil in the lubricating oil circuit 20. According to the first lubricating oil pump stopping unit 75, it is possible to suppress the low-temperature-side coolant from becoming higher in the low-temperature-side coolant circuit 30 in which the circulation of the low-temperature-side coolant is stopped.

The high-temperature-side coolant temperature determination unit 76 determines whether the high-temperature-side coolant temperature detected by the high-temperature-side coolant temperature sensor 94 is equal to or higher than the first predetermined temperature. The first predetermined temperature is determined based on the boiling point of the high-temperature-side coolant, and is stored in the memory 72. The first predetermined temperature is, for example, 85° C. which is slightly lower than the boiling point (100° C.) of water.

When the collision detection unit 63 of the airbag ECU 60 detects collision of the vehicle 10 and the high-temperature-side coolant temperature determination unit 76 determines that the high-temperature-side coolant temperature is equal to or higher than the first predetermined temperature, the high-temperature-side water pump stopping unit 77 stops the high-temperature-side water pump 51 and stops circulation of the high-temperature-side coolant in the high-temperature-side coolant circuit 50. According to the high-temperature-side water pump stopping unit 77, it is possible to suppress the high-temperature-side coolant from leaking and adversely affecting the surroundings.

When the high-temperature-side water pump 51 is stopped by the high-temperature-side water pump stopping unit 77, the first compressor stopping unit 78 stops the compressor 41 and stops the circulation of the refrigerant in the refrigeration cycle circuit 40. According to the first compressor stopping unit 68, in the high-temperature-side coolant circuit 50 in which the circulation of the high-temperature-side coolant is stopped, it is possible to suppress the high-temperature-side coolant from becoming higher in temperature.

The electric heater stopping unit 79 stops the electric heater 52 when the high-temperature-side water pump 51 is stopped by the high-temperature-side water pump stopping unit 77. According to the electric heater stopping unit 79, it is possible to suppress the high-temperature-side coolant from becoming higher in the high-temperature-side coolant circuit 50 in which the circulation of the high-temperature-side coolant is stopped.

The lubricating oil temperature determination unit 80 determines whether the lubricating oil temperature detected by the lubricating oil temperature sensor 91 is equal to or higher than the second predetermined temperature. The second predetermined temperature is determined based on the boiling point of the lubricating oil and stored in the memory 72. The second predetermined temperature is set to 170° C., which is slightly lower than the boiling point (180 to 200° C.) of the lubricating oil, for example.

When the collision detection unit 63 of the airbag ECU 60 detects the collision of the vehicle 10 and the lubricating oil temperature determination unit 80 determines that the lubricating oil temperature is equal to or higher than the second predetermined temperature, the second lubricating oil pump stopping unit 81 stops the lubricating oil pump 21 and stops the circulation of the lubricating oil in the lubricating oil circuit 20. According to the second lubricating oil pump stopping unit 81, it is possible to suppress the high-temperature lubricating oil from leaking and adversely affecting the surroundings.

The refrigerant temperature determination unit 82 determines whether the refrigerant temperature detected by the refrigerant temperature sensor 93 is equal to or higher than the third predetermined temperature. The third predetermined temperature is determined based on the boiling point of the refrigerant oil and stored in the memory 72. The third predetermined temperature is set to 700° C., which is slightly lower than the boiling point (700° C. or higher) of the refrigerant, for example.

When the collision of the vehicle 10 is detected by the collision detection unit 63 of the airbag ECU 60 and the refrigerant temperature determination unit 82 determines that the refrigerant temperature is equal to or higher than the third predetermined temperature, the second compressor stopping unit 83 stops the compressor 41 and stops the circulation of the refrigerant in the refrigeration cycle circuit 40. According to the second compressor stopping unit 83, it is possible to suppress the high-temperature refrigerant from leaking and adversely affecting the surroundings.

Circuit Stop Control

The flow of the circuit stop control will be described with reference to FIG. 3.

In S11, when the collision detection unit 63 of the airbag ECU 60 detects the collision of the vehicles 10, the process proceeds to S12. Note that S11 is not limited to a case where the collision of the vehicles 10 is detected by the collision detection unit 63 of the airbag ECU 60, and may be a case where the pop-up hood is operated by the collision.

In S12, when the low-temperature-side coolant temperature determination unit 73 determines that the low-temperature-side coolant temperature is equal to or higher than the first predetermined temperature, the process proceeds to S13.

In S13, the low-temperature-side water pump 31 of the low-temperature-side coolant circuit 30 and the lubricating oil pump 21 of the lubricating oil circuit 20 are stopped, and the circulation of the low-temperature-side coolant in the low-temperature-side coolant circuit 30 and the circulation of the lubricating oil in the lubricating oil circuit 20 are stopped.

In S14, when the high-temperature-side coolant temperature determination unit 76 determines that the high-temperature-side coolant temperature is equal to or higher than the first predetermined temperature, the process proceeds to S15.

In S15, the high-temperature-side water pump 51 and the electric heater 52 of the high-temperature-side coolant circuit 50 and the compressor 41 of the refrigeration cycle circuit 40 are stopped, and circulation and heating of the high-temperature-side coolant in the high-temperature-side coolant circuit 50 and circulation of the refrigerant in the refrigeration cycle circuit 40 are stopped.

In S16, when the lubricating oil temperature determination unit 80 determines that the lubricating oil temperature is equal to or higher than the second predetermined temperature, the process proceeds to S17. In S17, the lubricating oil pump 21 of the lubricating oil circuit 20 is stopped, and the circulation of the lubricating oil in the lubricating oil circuit 20 is stopped.

In S18, when the refrigerant temperature determination unit 82 determines that the refrigerant temperature is equal to or higher than the third predetermined temperature, the process proceeds to S19. In S19, the compressor 41 of the refrigeration cycle circuit 40 is stopped, and the circulation of the refrigerant in the refrigeration cycle circuit 40 is stopped.

Hereinafter, an example of an embodiment of the present disclosure will be described in detail. In the following description, specific shapes, materials, directions, numerical values, and the like are examples for facilitating the understanding of the present disclosure, and can be appropriately changed according to applications, purposes, specifications, and the like.

It should be noted that the present disclosure is not limited to the above-described embodiments and modifications thereof, and it goes without saying that various changes and improvements can be made within the scope of the matters described in the claims of the present application.

What is claimed is:

1. A vehicle control device for a vehicle comprising:
   a first heat medium circuit including
      a cooler configured to cool a heat source mounted on the vehicle using a first heat medium,
      a radiator configured to release heat from the first heat medium into air, and
      a first drive device configured to circulate the first heat medium between the cooler and the radiator; and
   a collision detection device configured to detect a collision, wherein
   in a case where no collision is detected by the collision detection device, the vehicle control device continues to drive the first drive device to circulate the first heat medium between the cooler and the radiator, and
   in a case where a collision is detected by the collision detection device, and a temperature of the first heat medium is equal to or higher than a first predetermined temperature determined based on a boiling point of the first heat medium, the vehicle control device stops the first drive device and stops circulation of the first heat medium between the cooler and the radiator.

2. The vehicle control device according to claim 1, further comprising a second heat medium circuit configured to exchange heat with the first heat medium circuit, wherein
   the second heat medium circuit includes a second drive device configured to circulate a second heat medium having a boiling point higher than the boiling point of the first heat medium, wherein
   in the case where a collision is detected by the collision detection device, and the temperature of the first heat medium is equal to or higher than the first predetermined temperature, the vehicle control device stops the second drive device.

3. The vehicle control device according to claim 2, wherein the second heat medium is lubricating oil for a transaxle.

4. The vehicle control device according to claim 2, further comprising a third heat medium circuit, wherein
   the third heat medium circuit includes:
      a third drive device configured to circulate a third heat medium having a boiling point higher than the boiling point of the first heat medium; and a heating device configured to heat the third heat medium, and in the case where following conditions 1) to 3) are satisfied, the vehicle control device stops the third drive device and the heating device:

1) a collision is detected by the collision detection device;
2) the temperature of the first heat medium is lower than the first predetermined temperature; and
3) a temperature of the third heat medium is equal to or higher than the first predetermined temperature.

5. The vehicle control device according to claim 4, wherein the second heat medium having a boiling point higher than the boiling point of the third heat medium, and in a case where the conditions 1) and 2) and following conditions 4) and 5) are satisfied, the vehicle control device stops the second drive device:

4) the temperature of the third heat medium is lower than the first predetermined temperature; and
5) the temperature of the second heat medium is equal to or higher than a second predetermined temperature determined based on the boiling point of the second heat medium.

6. The vehicle control device according to claim 5, further comprising a fourth heat medium circuit including a fourth drive device configured to circulate a fourth heat medium, the fourth heat medium having a boiling point higher than the boiling point of the first heat medium, the boiling point of the second heat medium, and the boiling point of the third heat medium, wherein in the case where the conditions 1), 2), and 4) and following conditions 6) and 7) are satisfied, the vehicle control device stops the fourth drive device:

6) the temperature of the second heat medium is lower than the second predetermined temperature; and
7) a temperature of the fourth heat medium is equal to or higher than a fourth predetermines temperature determined based on the boiling point of the first heat medium.

7. The vehicle control device according to claim 1, wherein the heat source is a battery.

* * * * *